(12) United States Patent
Smith, III (10) Patent No.: US 7,913,974 B2
(45) Date of Patent: Mar. 29, 2011

(54) HYDRAULIC COUPLING WITH SMOOTH BORE POPPET VALVE

(75) Inventor: Robert E Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 332 days.

(21) Appl. No.: 12/140,087

(22) Filed: Jun. 16, 2008

(65) Prior Publication Data

US 2009/0308469 A1    Dec. 17, 2009

(51) Int. Cl.
*F16L 37/28* (2006.01)
(52) U.S. Cl. .................. 251/149.6; 137/614.04
(58) Field of Classification Search ......... 137/614.03–614.05; 251/149.1, 251/149.6
See application file for complete search history.

(56) References Cited

U.S. PATENT DOCUMENTS

| | | | |
|---|---|---|---|
| 2,505,093 A * | 4/1950 | Brock | 137/614.04 |
| 3,777,990 A | 12/1973 | Herzog | |
| 4,900,071 A | 2/1990 | Smith, III | |
| 5,052,439 A | 10/1991 | Smith, III | |
| 5,360,035 A | 11/1994 | Smith | |
| 5,692,538 A | 12/1997 | Smith, III | |
| 6,085,785 A | 7/2000 | Smith, III | |
| 6,095,191 A | 8/2000 | Smith, III | |
| 6,206,040 B1 | 3/2001 | Smith, III | |
| 6,227,245 B1 | 5/2001 | Smith, III | |
| 6,237,632 B1 | 5/2001 | Smith, III | |
| 6,283,444 B1 | 9/2001 | Smith, III | |
| 6,357,722 B1 | 3/2002 | Smith, III | |
| 6,375,153 B2 | 4/2002 | Smith, III | |
| 6,474,359 B1 | 11/2002 | Smith, III | |
| 6,575,430 B1 | 6/2003 | Smith, III | |
| 6,626,207 B1 | 9/2003 | Smith, III | |
| 6,631,734 B2 | 10/2003 | Smith, III | |
| 6,637,459 B1 | 10/2003 | Smith, III | |
| 6,755,794 B2 * | 6/2004 | Soukup | 600/585 |
| 7,159,616 B2 | 1/2007 | Watson et al. | |
| 7,252,112 B1 * | 8/2007 | Imler et al. | 137/614.04 |

FOREIGN PATENT DOCUMENTS

| | | |
|---|---|---|
| GB | 2361039 A | 10/2001 |
| GB | 2362934 A | 12/2001 |
| GB | 2392964 A | 3/2004 |

* cited by examiner

*Primary Examiner* — Kevin L Lee
(74) *Attorney, Agent, or Firm* — Wong, Cabello, Lutsch, Rutherford & Brucculeri, L.L.P.

(57) ABSTRACT

Male and/or female members of a hydraulic coupling have an internal poppet valve that is held in the closed position by a flat wire, helical compression spring. The spring is configured such that when the poppet valve is moved to its fully open position, the coils of the spring are completely compressed thereby forming a substantially smooth bore tube for the flow of hydraulic fluid. The flat wire, helical compression spring may also act as a valve stop, limiting movement of the poppet valve and providing the necessary resistance to move the valve actuator of a corresponding valve in a mating member.

18 Claims, 6 Drawing Sheets

HYDRAULIC COUPLING WITH SMOOTH BORE POPPET VALVE

CROSS-REFERENCES TO RELATED APPLICATIONS

NONE

STATEMENT REGARDING FEDERALLY SPONSORED RESEARCH OR DEVELOPMENT

NOT APPLICABLE

BACKGROUND OF THE INVENTION

1. Field of the Invention

This invention relates to hydraulic coupling members. More particularly, it relates to male and female hydraulic coupling members having internal, spring-loaded poppet valves for controlling the flow of hydraulic fluid.

2. Description of the Related Art Including Information Disclosed under 37 CFR 1.97 and 1.98

A wide variety of hydraulic couplings include internal poppet valves for preventing the loss of hydraulic fluid when the coupling is disconnected. Hydraulic couplings designed for subsea use also commonly employ poppet valves for preventing seawater from entering the hydraulic system when the coupling members are de-mated. In many designs, the poppet valves include mechanical valve actuators which cause valves that are spring-loaded to the closed position to open upon coupling make-up.

U.S. Pat. Nos. 4,900,071 and 5,052,439 disclose an undersea hydraulic coupling which includes a male member and female member, and a two-piece retainer for restraining radial movement of a wedge-shaped annular seal into the central bore of the female member. The two-piece retainer includes a cylindrical retainer sleeve member that slides within the female member bore, and a threaded retainer-locking member which engages threads in the wall of the central bore. The retainer-locking member holds the retainer sleeve member in place within the female member bore. The annular seal is restrained from radial movement by a dovetail interfit with a mating shoulder on at least one of the retainer sleeve and the retainer-locking members.

U.S. Pat. No. 5,360,035 discloses an undersea hydraulic coupling having a poppet valve movable between an open and a closed position. The poppet valve is pressure balanced—i.e., it operates without substantial fluid pressure exerted axially against the face of the poppet valve. When the poppet valve is opened, radial passages are interconnected through an annular cavity between the poppet valve body and the valve bore.

U.S. Pat. No. 5,692,538 discloses an undersea hydraulic coupling member having angled flow ports to prevent ingress of debris into the hydraulic lines and having a bleed passage to allow trapped hydraulic fluid to bleed off when the coupling members are disconnected. The poppet valve in combination with the angled flow ports helps keep the hydraulic system clear of debris when the members are disconnected.

U.S. Pat. No. 6,085,785 discloses an undersea hydraulic coupling having an extended probe section. The male member of the coupling houses a valve spring having a larger diameter than the diameter of the valve body. The valve spring is configured to close the valve to prevent ingress of sea water or leakage of hydraulic fluid from the system. One or more seals engage the extended probe section.

U.S. Pat. No. 6,095,191 discloses an undersea hydraulic coupling having a male member with a tapered, frusta-conical surface and a female member with a tapered, frusta-conical bore. Before radial seals engage the frusta-conical surfaces, trapped seawater is expelled or displaced from the bore through the space between the coupling members, thereby preventing seawater from entering hydraulic lines.

U.S. Pat. No. 6,474,359 discloses an undersea hydraulic coupling member having a bleed valve which opens to allow hydraulic fluid trapped in the coupling member to escape until the pressure is below a predetermined level. The coupling member employs a poppet valve within a sleeve.

U.S. Pat. No. 6,375,153 discloses an undersea hydraulic coupling having a stepped internal bore dimensioned to increase the flow rate through the coupling. The coupling allows an increased flow rate without increasing the size or weight of the coupling by positioning the poppet valve in the body section, rather than in the probe section, of the male coupling member.

U.S. Pat. No. 6,237,632 discloses an undersea hydraulic coupling member having a primary poppet valve and a secondary poppet valve to improve reliability against leakage when the coupling members are separated. A spring extends between the first poppet valve and the actuator for the second poppet valve. The secondary poppet valve remains closed unless the first poppet valve is fully opened, so that debris or other material that could prevent sealing of the first poppet valve will not cause leakage of hydraulic fluid through the second poppet valve.

U.S. Pat. No. 6,357,722 discloses an undersea hydraulic coupling having a poppet valve with an actuator extending from the valve and a guide between the actuator and bore. The guide is a sleeve-shaped member around the actuator with flow passages which ensure a smooth flow of hydraulic fluid through the annulus between the coupling bore and actuator. The guide also helps prevent damage to the actuator, and aligns the actuator during connections, disconnections and use.

U.S. Pat. No. 6,283,444 discloses an undersea hydraulic coupling member having a valve actuator which extends through the probe section and the leading face, and has angled flow ports in the probe section which help keep the hydraulic system clear of debris when the coupling members are disconnected subsea.

U.S. Pat. No. 6,227,245 discloses an undersea hydraulic coupling member which has angled flow ports to prevent ingress of debris into the hydraulic lines. A port guard attached to the valve actuator closes the flow ports unless the poppet valve is opened by mutual engagement with an opposing coupling member.

U.S. Pat. No. 6,626,207 discloses an undersea hydraulic coupling with interlocking poppet valve actuators. The actuators extend from the poppet valves of each coupling member and interlock to resist bending and/or other lateral displacement caused by hydraulic fluid flow and turbulence in the coupling member bores and at the junction between the coupling members.

U.S. Pat. No. 6,631,734 discloses a dummy undersea hydraulic coupling member for protecting an opposing undersea hydraulic coupling member when the hydraulic lines are not operating. The dummy undersea hydraulic coupling member has a water displacement expansion chamber with a piston therein that allows trapped water and/or air to move from the receiving chamber to the water displacement expansion chamber during connection of the dummy coupling member to the opposing coupling member. The dummy coupling member may include a normally-closed poppet valve in the water displacement expansion chamber which blocks water and/or air from moving between the receiving chamber and the water displacement expansion chamber in the closed position. The poppet valve opens in response to water and/or air pressure acting upon it.

U.S. Pat. No. 7,159,616 discloses a dual-path hydraulic coupling. A female hydraulic coupling member comprises a first flow port; a second flow port; a third flow port in fluid communication with both the first flow port and the second flow port; a first poppet valve for opening and closing the first flow port; and a second poppet valve for opening and closing the second flow port, the second poppet valve being connected to the first poppet valve such that the second poppet valve moves to the closed position when the first poppet valve is open and moves to the open position when the first poppet valve is closed.

BRIEF SUMMARY OF THE INVENTION

A spring-loaded poppet valve within a hydraulic coupling member has a helical, flat wire spring that, when compressed, forms a smooth bore cylinder for the passage of hydraulic fluid and may act as a mechanical stop for the poppet valve travel.

DETAILED DESCRIPTION OF THE INVENTION

Figure 1:
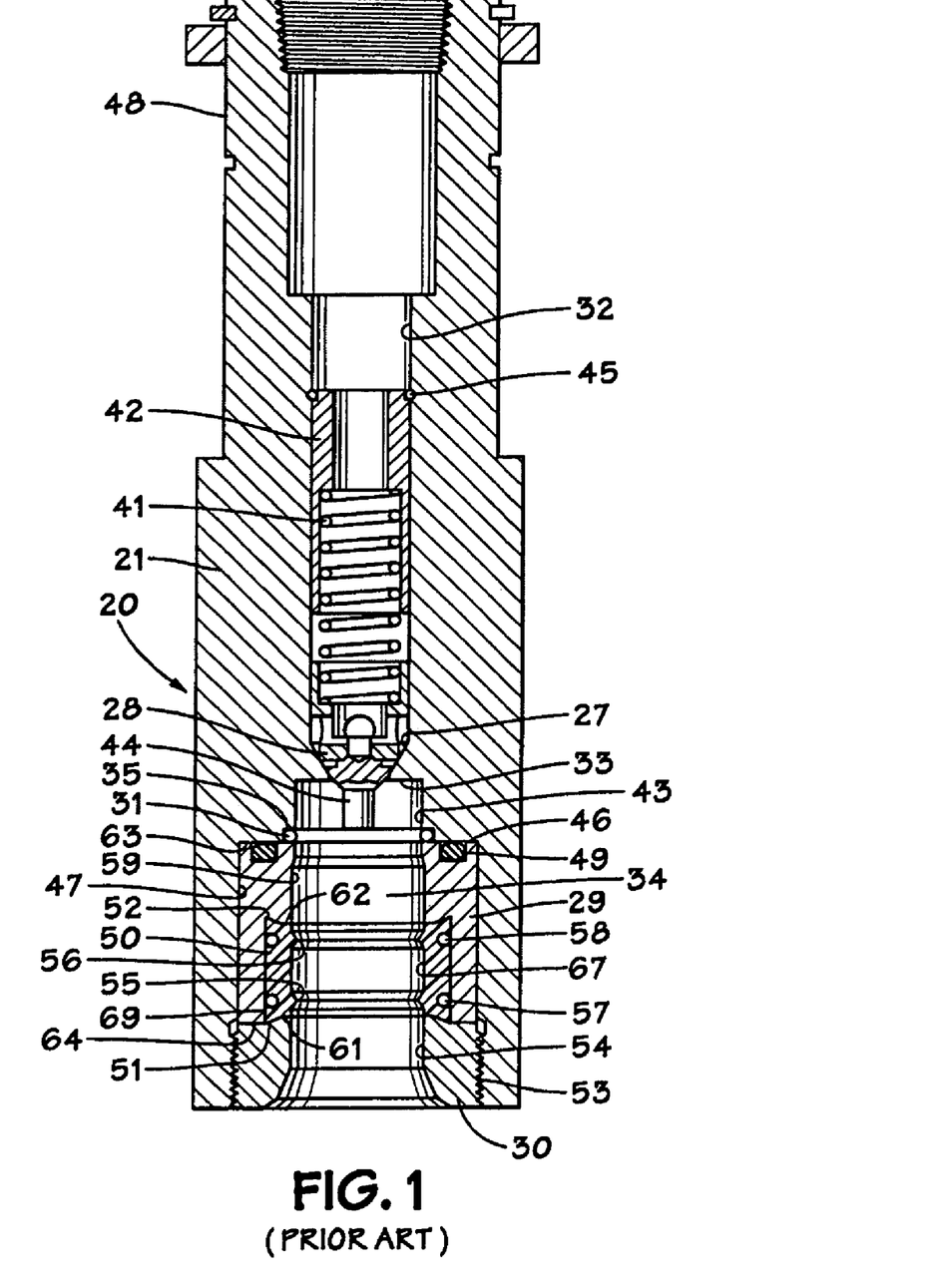
FIG. 1 is a cross-sectional view of a hydraulic coupling whose members are equipped with poppet valves of the prior art.

As shown in FIG. 1, in a coupling of the prior art, female member 20 comprises body 21, handle 48 which may be threaded to a manifold plate, and central bore 32 which has several variations in its diameter as it extends through the female member. The first end of the bore may be internally threaded for connection to a hydraulic line. Other connection means known in the art may be utilized including welding, swaging, compression fittings, and the like. A cylindrical passageway extends longitudinally within the female member body and terminates at valve seat 27. Adjacent valve seat 27 is shoulder 33 which forms one end of receiving chamber 34.

In the coupling illustrated in FIG. 1, the receiving chamber which receives the probe of the male member has a stepped internal diameter with internal shoulders 33, 35 and 63. The receiving chamber has a first smaller diameter 43 and a second larger diameter 47.

The female member 20 may include optional poppet valve 28 which is sized to slide within the cylindrical passageway. The poppet valve may be conical in shape and is urged by valve spring 41 into a seated position against valve seat 27. When the poppet valve is in a closed position against the valve seat, it seals fluid from flowing between the male member and the female member. Hollow spring seat 42 anchors the valve spring 41 and is held in place by clip 45. Actuator 44 extends from the apex of the poppet valve.

Ring shaped seal 50 is positioned in the receiving chamber of the female member. The ring shaped seal may be an elastomer or other polymer seal that is flexible and resilient. In other couplings of the prior art, seal 50 is fabricated from an engineering plastic such as polyetheretherketone (PEEK). Seal 50 has a first inclined shoulder surface 52 and a second inclined shoulder surface 51. The axial thickness of the elastomeric seal at its outer circumference (adjacent element 69 in FIG. 1) is greater than the axial thickness of the seal at inner circumference 67. The seal thus has a generally wedge-shaped cross section. Seal 50 may have one or more radial sealing surfaces 55, 56 extending inwardly from the seal's inner circumference 67. Each of the radial sealing surfaces extends inwardly from the inner circumference so as to engage the probe of the male member when the probe is inserted through the seal. The radial sealing surfaces may be elastically deformed by the probe when it is inserted through the seal. The radial sealing surfaces 55 and 56 provide guide points to help align and guide the probe of the male member when it is inserted through the seal and into the receiving chamber 34.

In the prior art female coupling member illustrated in FIG. 1, probe seal 50 has grooves in its outer circumference 66. O-rings 57, 58 or similar seals may be positioned in each of the grooves. Alternatively, seal 50 may have a plurality of integral sealing projections which extend from its outer circumference.

In the female coupling member shown in FIG. 1, implosion of the seal into the receiving chamber due to low pressure or vacuum is resisted because the seal has an interlocking fit with reverse inclined shoulder surface 62 of seal retainer 29 and reverse inclined shoulder surface 61 of locking member 30. The seal retainer may be a cylindrical sleeve that slides into the second diameter 47 of the receiving chamber. Alternatively, the seal retainer may be threaded to the female member or engaged to the female member by other means. In the illustrated coupling, when the seal retainer is fully engaged with the female member, first end 46 of the seal retainer abuts shoulder 63. The seal retainer holds hollow radial metal seal 31 on internal shoulder 35.

In the illustrated female coupling member, the seal retainer has a first internal circumferential surface 59 adjacent the first end thereof and a second internal circumferential surface 69 adjacent the second end thereof. The internal diameter of the first inner circumferential surface is smaller than the internal diameter of the second internal circumferential surface. Reverse inclined shoulder 62 is situated between the first and second internal circumferential surfaces. The reverse inclined shoulder has an interlocking fit with seal 50 to restrain the seal from moving inwardly in a radial direction. O-ring 49 is positioned in a groove at the first end 46 of the seal retainer to provide a face-type seal between the seal retainer and shoulder 63.

In the illustrated prior art coupling, locking member 30 engages the female coupling member with threads 53. Other engaging means known in the art may be used. When the locking member is fully secured to the female coupling member, first end 64 abuts seal retainer 29 and holds the seal retainer in place. The locking member 30 has a central opening with an internal diameter 54 that allows insertion of the probe of the male member. Reverse inclined shoulder surface 61 holds seal 50 in place and restrains the seal from moving inward in a radial direction.

The present invention provides an alternative poppet valve design and may best be understood by reference to the exemplary embodiment shown in the drawing figures.

Figure 2:
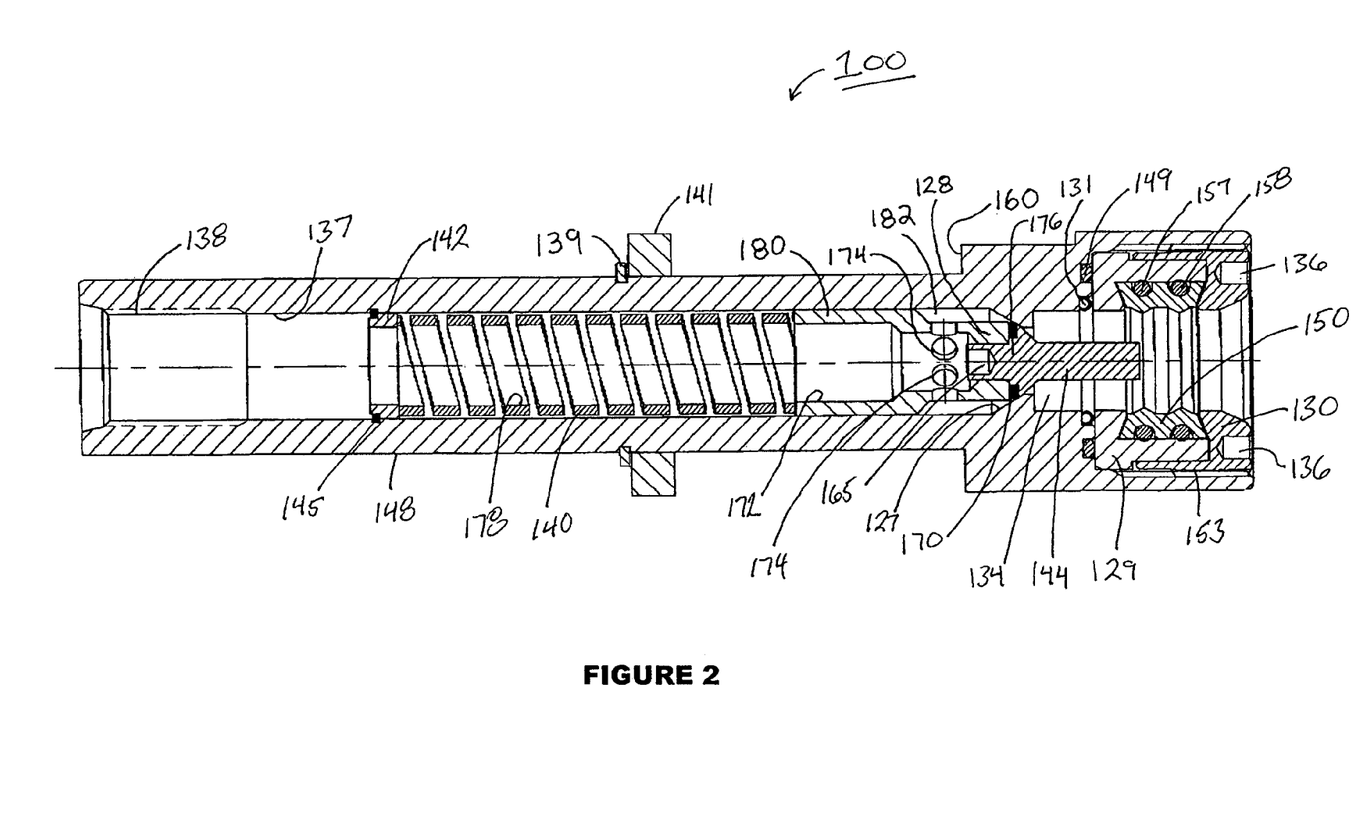
FIG. 2 is a cross-sectional view of a female hydraulic coupling member equipped with a poppet valve according to the invention shown in the closed position.

FIG. 2 depicts a female hydraulic coupling member 100 equipped with a poppet valve according to the present invention. The probe seals 150 and 131 and receiving chamber 134 of female coupling member 100 are similar to those of the prior art coupling illustrated in FIG. 1. Coupling 100, however, has a seal cartridge comprised of seal retainer 129 and locking shell 130. A seal cartridge of this type is disclosed in U.S. Pat. No. 7,163,190 to Robert E. Smith, III. The seal cartridge retains probe seal 150 with a dovetail interlocking fit and optional O-rings 157 and 158 ensure a fluid-tight seal between probe seal 150 and seal retainer 129. The seal cartridge is held within the body of the female member 100 by threaded portion 153 which engages corresponding threads on the interior distal portion of receiving chamber 134. Spanner holes 136 in locking member 130 receive a tool for facilitating the installation and removal of the seal cartridge. As in the coupling of FIG. 1, seal retainer 129 also retains metal seal 131 on an internal shoulder of receiving chamber 134 and O-ring 149 (housed in a groove in a second shoulder within receiving chamber 134) provides a seal between retainer 129 and the body of female coupling 100.

Figure 3:
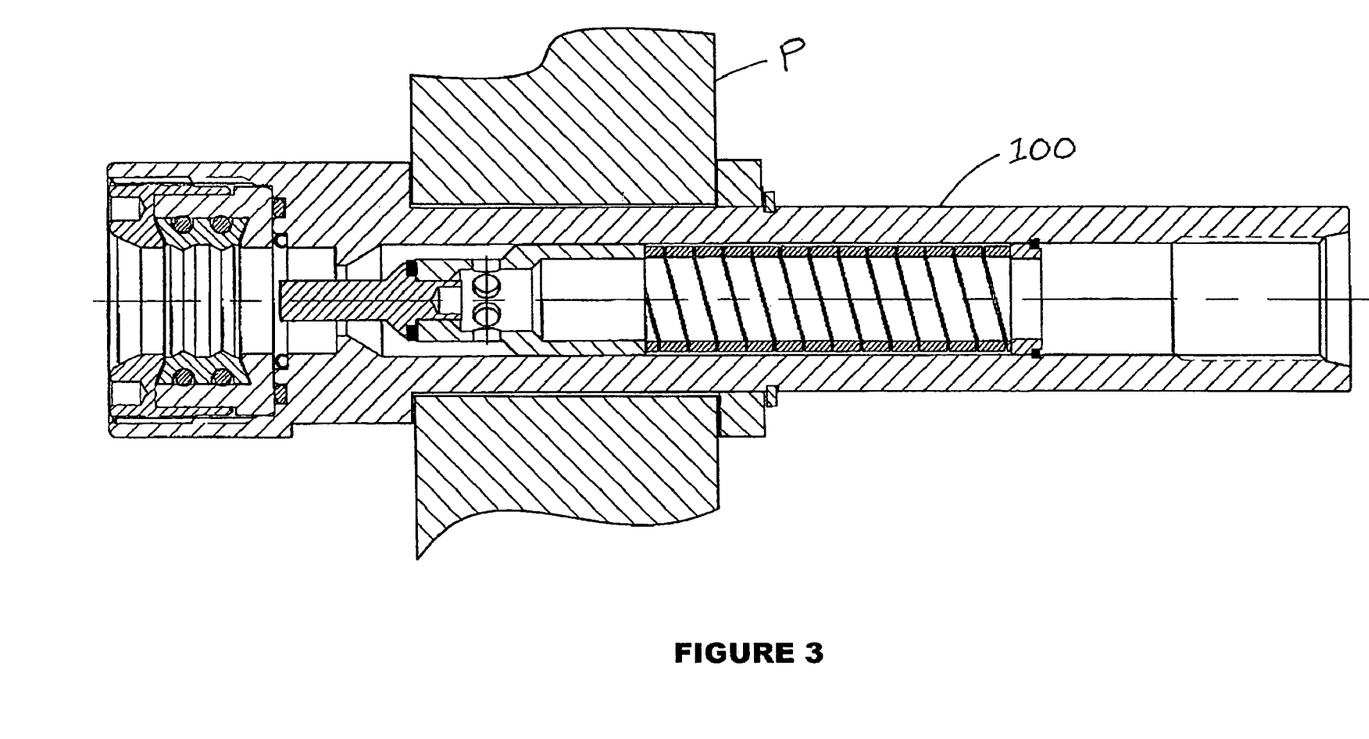
FIG. 3 is a cross-sectional view of a female hydraulic coupling member installed in a mounting plate and equipped with a poppet valve according to the invention shown in the open position.

Female coupling member 100 has a generally cylindrical body 120 with a central bore 132 having sections of various internal diameter. The portion of body 120 distal from the end having receiving chamber 134 forms handle 148 which may be used to secure coupling 100 in a manifold plate or other such holding device. Clip 139 may engage an external groove on handle 148 to secure thrust washer 141. As shown in FIG. 3, coupling 100 may be mounted in a manifold plate P with shoulder 160 bearing against a first surface thereof and thrust washer 141 bearing against an opposing surface. One end of bore 132 has connector 138 for connecting the coupling to a hydraulic line. Connector 138 may be internally or externally threaded, or the connection may be made by welding, swaging, compression fittings or other means well known in the art.

A portion of bore 132 may have beveled portion 127 to serve as a seat for poppet valve 128. In the illustrated embodiment, poppet valve 128 is comprised of valve actuator 144, spring contactor 180, poppet seal 170, radial flow passages 174, valve spring 140 and valve seat 142.

Valve seal 170, which may be an elastomer or other suitable material, is held between frustum portion 176 of actuator 144 and poppet body 180. In the illustrated embodiment, one end of actuator 144 is held within body 180 by flaring at cavity 165. When poppet valve 128 is in the closed position, seal 170 is pressed against beveled surface 127 by the action of compression spring 140. The flow of hydraulic fluid out of the coupling and seawater into the coupling is thereby prevented when the coupling is disconnected.

Helical compression spring 140 is formed of flat wire and preferably has an outside diameter slightly smaller than inner diameter 137 of bore 132 to permit spring 140 to compress without binding against the walls of bore 132. The ends of spring 140 may be closed & ground or open & ground.

Spring 140 may be formed of any suitable material. Examples of suitable materials include, but are not limited to: spring steel, stainless steel, silicon-chrome, high carbon steel, beryllium-copper, INCONEL® alloys, galvanized wire, mild steel, phosphor bronze and brass.

At one end, spring 140 acts against spring seat 142 which is retained in bore 132 by retainer clip 145 which may engage a groove in the wall of bore 132. The internal diameter of spring seat 142 is preferably the same as internal diameter of spring bore 178 when spring 140 is fully compressed. Likewise, the internal diameter 172 of spring contactor 180 is preferably the same as the i.d. of spring bore 178.

FIG. 3 shows female coupling member 100 with its poppet valve in the open position. The action of poppet valve 128 is as follows: when coupling 100 is connected to a corresponding male coupling member (200), valve actuator 144 contacts a corresponding actuator in the male member compressing spring 140 and opening poppet valve 128 by moving seal 170 off of seat 127. Hydraulic fluid may then flow from receiving chamber 134 past seat 127 and into annular flow passage 182. From thence the flow is through radial flow ports 174 and into the hollow central cavity of poppet body 128. When spring 140 is fully compressed, its helical coils contact one another thereby forming a substantially smooth bore tube. This facilitates the flow of hydraulic fluid through the coupling member. In couplings of the prior art such as those illustrated in FIG. 1, the round wire valve spring 40 provides a rough inner surface which may hinder the flow of hydraulic fluid.

It will also be appreciated that when fully compressed flat wire spring 140 provides a load path extending from actuator 144 through poppet body 128 to spring seat 142 which is fixed by retainer clip 145. This feature enables spring seat 142 to be smaller than those of the prior art since flat wire spring 140 is less susceptible to buckling out of column when fully compressed than a round wire spring. As shown in FIG. 1, spring seat 42 of the prior art is equipped with an extension for ensuring positive contact with poppet valve body 28 when spring 40 is compressed. This is unnecessary in a coupling according to the present invention and enables a coupling of a fixed size to have larger internal flow passage for hydraulic fluid.

Figure 4:
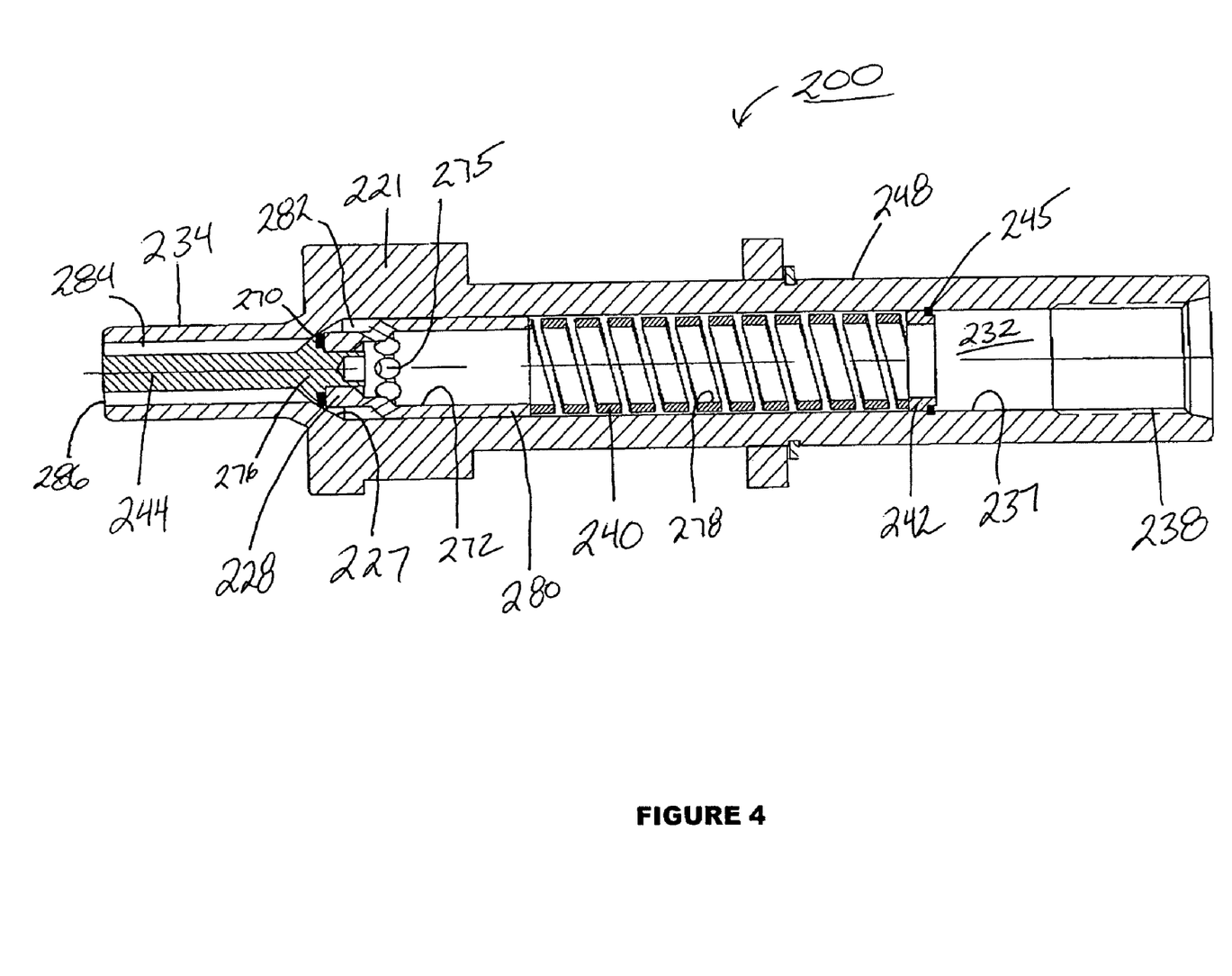
FIG. 4 is a cross-sectional view of a male hydraulic coupling member equipped with a poppet valve according to the invention shown in the closed position.

FIG. 4 depicts a male hydraulic coupling member 200 equipped with a poppet valve according to the present invention. Male coupling member 200 has a generally cylindrical body 221 with a central bore 232 having sections of various internal diameter. At one end of body 221 is male probe 234 for insertion into the receiving chamber of a corresponding female member (100). The portion of body 220 distal from probe 234 forms handle 248 which may be used to secure coupling 200 in a manifold plate or other such holding device. One end of bore 232 has connector 238 for connecting the coupling to a hydraulic line. Connector 238 may be internally or externally threaded, or the connection may be made by welding, swaging, compression fittings or other means well known in the art.

A portion of bore 232 may have beveled portion 227 to serve as a seat for poppet valve 228. In the illustrated embodiment, poppet valve 228 is comprised of valve actuator 244, spring contactor 280, poppet seal 270, radial flow passages 274, valve spring 240 and valve seat 242.

Valve seal 270 which may be an elastomer or other suitable material is held between frustum portion 276 of actuator 244 and poppet body 280. When poppet valve 228 is in the closed position, seal 270 is pressed against beveled surface 227 by the action of compression spring 240. The flow of hydraulic fluid out of the coupling and seawater into the coupling is thereby prevented when the coupling is disconnected.

Helical compression spring 240 is formed of flat wire and preferably has an outside diameter slightly smaller than inner diameter 237 of bore 232 to permit spring 240 to compress without binding against the walls of bore 232. The ends of spring 240 may be closed & ground or open & ground.

Spring 240 may be formed of any suitable material. Examples of suitable materials include, but are not limited to: spring steel, stainless steel, silicon-chrome, high carbon steel, beryllium-copper, INCONEL® alloys, galvanized wire, mild steel, phosphor bronze and brass.

At one end, spring 240 acts against spring seat 242 which is retained in bore 232 by retainer clip 245 which may engage a groove in the wall of bore 232. The internal diameter of spring seat 242 is preferably the same as internal diameter of spring bore 278 when spring 240 is fully compressed. Likewise, the internal diameter 272 of spring contactor 280 is preferably the same as the i.d. of spring bore 278.

Figure 5:
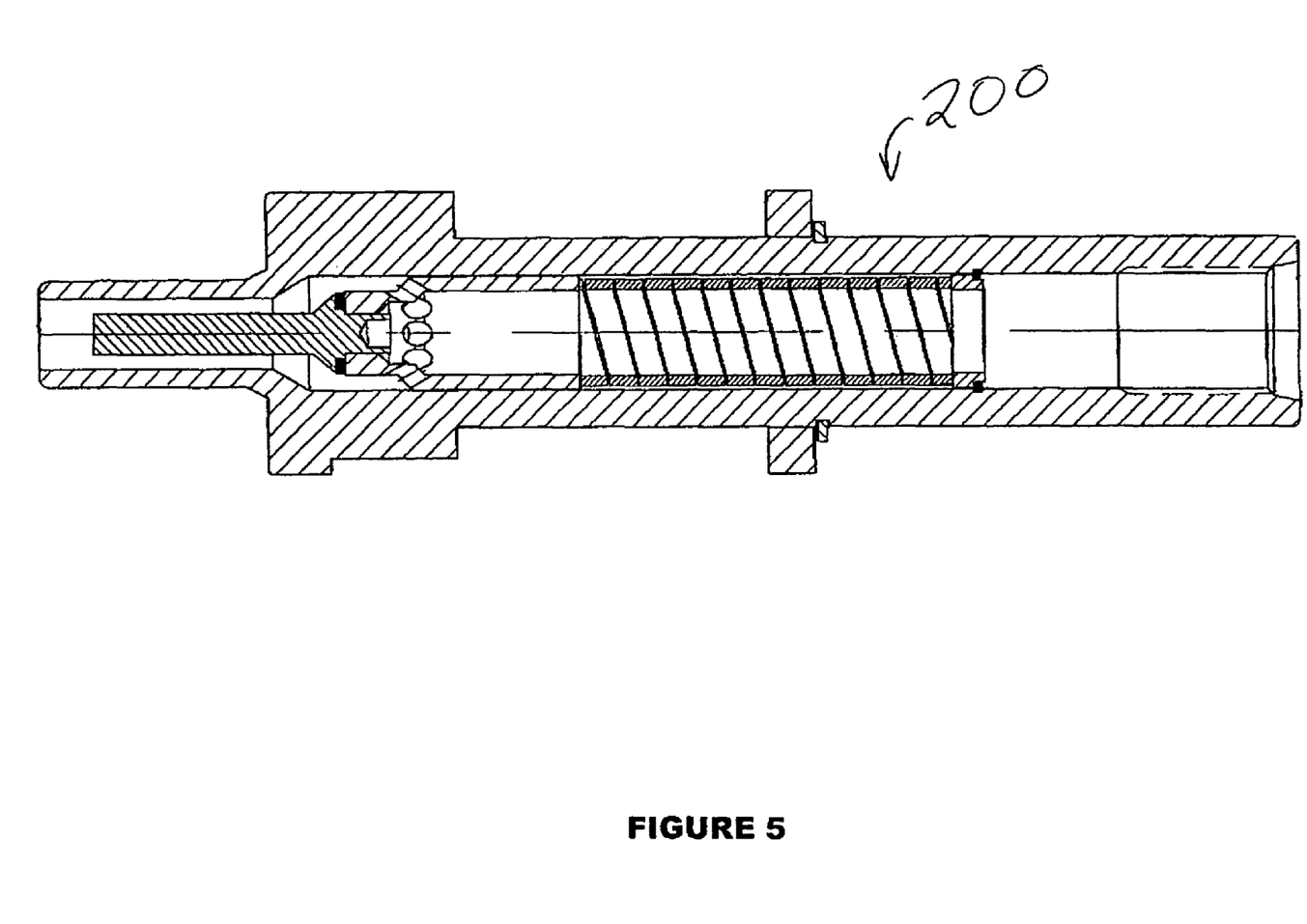
FIG. 5 is a cross-sectional view of a male hydraulic coupling member equipped with a poppet valve according to the invention shown in the open position.
Figure 6:
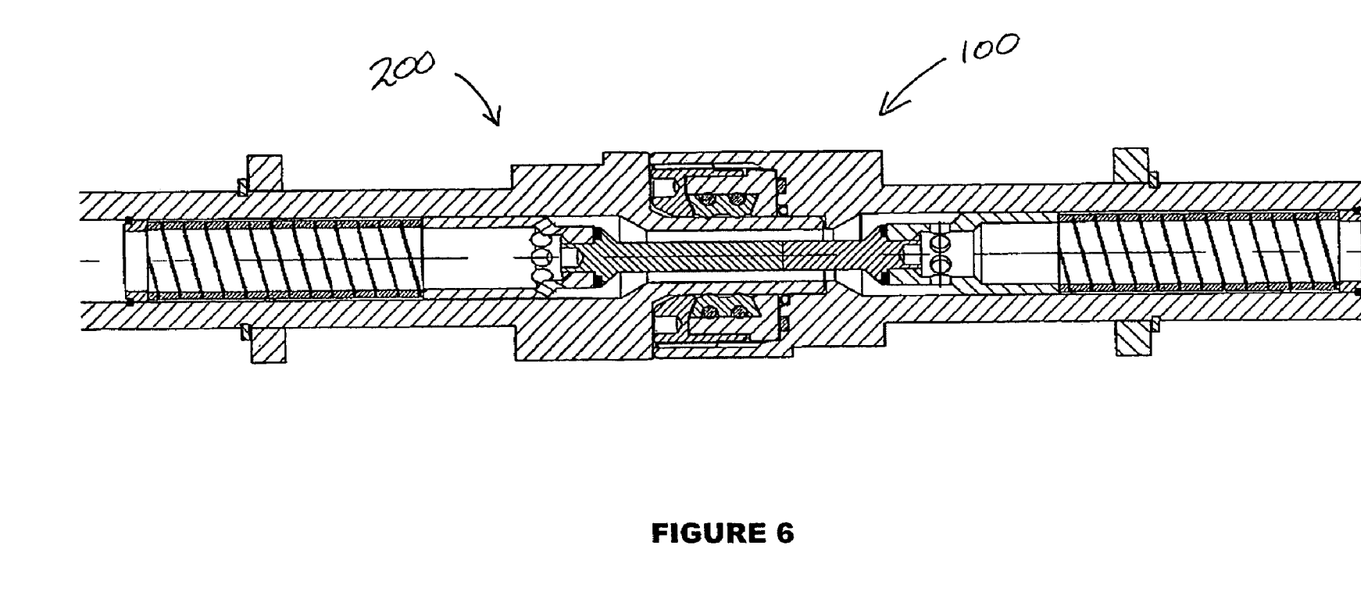
FIG. 6 is a cross-sectional view of connected male and female hydraulic coupling members each of which is equipped with a poppet valve according to the invention.

FIG. 5 shows male coupling member 200 with its poppet valve in the open position. The action of poppet valve 228 is as follows: when coupling 200 is connected to a corresponding female coupling member (100), valve actuator 244 contacts a corresponding actuator in the male member compressing spring 240 and opening poppet valve 228 by moving seal 270 off of seat 227. Hydraulic fluid may then flow from the receiving chamber of the female member (100) into opening 286 on the leading face of probe 234 and into annular probe flow passage 284 past seat 227 and into annular flow passage 282. From thence the flow is through angled flow ports 275 and into the hollow central cavity of poppet body 228. When spring 240 is fully compressed, its helical coils contact one another thereby forming a substantially smooth bore tube. This facilitates the flow of hydraulic fluid through the coupling member. In couplings of the prior art such as those illustrated in FIG. 1, the round wire valve spring 40 provides a rough inner surface which may hinder the flow of hydraulic fluid.

It will also be appreciated that when fully compressed flat wire spring 240 provides a load path extending from actuator 244 through poppet body 228 to spring seat 242 which is fixed by retainer clip 245. This feature enables spring seat 242 to be smaller than those of the prior art since flat wire spring 240 is less susceptible to buckling out of column when fully compressed than a round wire spring. As shown in FIG. 1, spring seat 42 of the prior art is equipped with an extension for ensuring positive contact with poppet valve body 28 when spring 40 is compressed. This is unnecessary in a coupling according to the present invention and enables a coupling of a fixed size to have larger internal flow passage for hydraulic fluid.

Although the invention has been described in detail with reference to certain preferred embodiments, variations and modifications exist within the scope and spirit of the invention as described and defined in the following claims.

What is claimed is:

1. A poppet valve for a hydraulic coupling comprising:
   a poppet valve body;
   a spring seat; and,
   a flat wire helical compression spring retained between the poppet valve body and the spring seat, said spring sized and configured such that, when the poppet valve is fully open, the flat wire helical spring is completely compressed and forms a substantially smooth bore tube.

2. A poppet valve as recited in claim 1 wherein the poppet valve body has a substantially tubular portion, the spring seat is substantially tubular and the internal diameter of the flat wire helical compression spring is substantially the same as the internal diameter of the of the tubular portion of the poppet valve body and the internal diameter of the spring seat.

3. A poppet valve as recited in claim 1 wherein the flat wire helical compression spring is formed of a material selected from the group comprised of:
   spring steel, stainless steel, silicon-chrome, high carbon steel, beryllium-copper, inconnel, galvanized wire, mild steel, phosphor bronze and brass.

4. A poppet valve as recited in claim 1 further comprising a valve actuator connected to the poppet valve body.

5. A poppet valve as recited in claim 1 wherein the flat wire helical compression spring has open and ground ends.

6. A poppet valve as recited in claim 1 wherein the flat wire helical compression spring has closed and ground ends.

7. A female hydraulic coupling member comprising:
   a poppet valve comprising:
   a poppet valve body;
   a spring seat; and,
   a flat wire helical compression spring retained between the poppet valve body and the spring seat, said spring sized and configured such that, when the poppet valve is fully open, the flat wire helical spring is completely compressed and forms a substantially smooth bore tube.

8. A female hydraulic coupling member as recited in claim 7 wherein the poppet valve body has a substantially tubular portion, the spring seat is substantially tubular and the internal diameter of the flat wire helical compression spring is substantially the same as the internal diameter of the of the tubular portion of the poppet valve body and the internal diameter of the spring seat.

9. A female hydraulic coupling member as recited in claim 7 wherein the flat wire helical compression spring is formed of a material selected from the group comprised of: spring steel, stainless steel, silicon-chrome, high carbon steel, beryllium-copper, inconnel, galvanized wire, mild steel, phosphor bronze and brass.

10. A female hydraulic coupling member as recited in claim 7 further comprising a valve actuator connected to the poppet valve body.

11. A female hydraulic coupling member as recited in claim 7 wherein the flat wire helical compression spring has open and ground ends.

12. A female hydraulic coupling member as recited in claim 7 wherein the flat wire helical compression spring has closed and ground ends.

13. A male hydraulic coupling member comprising:
   a poppet valve comprising:
   a poppet valve body;
   a spring seat; and,
   a flat wire helical compression spring retained between the poppet valve body and the spring seat, said spring sized and configured such that, when the poppet valve is fully open, the flat wire helical spring is completely compressed and forms a substantially smooth bore tube.

14. A male hydraulic coupling member as recited in claim 13 wherein the poppet valve body has a substantially tubular portion, the spring seat is substantially tubular and the internal diameter of the flat wire helical compression spring is substantially the same as the internal diameter of the of the tubular portion of the poppet valve body and the internal diameter of the spring seat.

15. A male hydraulic coupling member as recited in claim 13 wherein the flat wire helical compression spring is formed of a material selected from the group comprised of: spring steel, stainless steel, silicon-chrome, high carbon steel, beryllium-copper, inconnel, galvanized wire, mild steel, phosphor bronze and brass.

16. A male hydraulic coupling member as recited in claim 13 further comprising a valve actuator connected to the poppet valve body.

17. A male hydraulic coupling member as recited in claim 13 wherein the flat wire helical compression spring has open and ground ends.

18. A male hydraulic coupling member as recited in claim 13 wherein the flat wire helical compression spring has closed and ground ends.

* * * * *